US012606660B2

(12) United States Patent (10) Patent No.: US 12,606,660 B2
Otani et al. (45) Date of Patent: Apr. 21, 2026

(54) ACRYLIC RUBBER COMPOSITION

(71) Applicant: NOK CORPORATION, Tokyo (JP)

(72) Inventors: Keita Otani, Kanagawa (JP); Takahiro Anzai, Kanagawa (JP)

(73) Assignee: NOK CORPORATION, Tokyo (JP)

(*) Notice: Subject to any disclaimer, the term of this patent is extended or adjusted under 35 U.S.C. 154(b) by 644 days.

(21) Appl. No.: 17/794,711

(22) PCT Filed: Dec. 23, 2020

(86) PCT No.: PCT/JP2020/048092
§ 371 (c)(1),
(2) Date: Jul. 22, 2022

(87) PCT Pub. No.: WO2021/149443
PCT Pub. Date: Jul. 29, 2021

(65) Prior Publication Data
US 2023/0097137 A1 Mar. 30, 2023

(30) Foreign Application Priority Data
Jan. 24, 2020 (JP) ................................ 2020-010121

(51) Int. Cl.
*C08F 220/10* (2006.01)
*C08K 5/10* (2006.01)
*C08L 33/14* (2006.01)
(52) U.S. Cl.
CPC .............. *C08F 220/10* (2013.01); *C08K 5/10* (2013.01); *C08L 33/14* (2013.01)
(58) Field of Classification Search
None
See application file for complete search history.

(56) References Cited

U.S. PATENT DOCUMENTS

| | | | |
|---|---|---|---|
| 5,610,226 A | 3/1997 | Yamamoto et al. | |
| 11,866,532 B2 * | 1/2024 | Toge .................. | C08F 220/281 |
| 2007/0173621 A1 | 7/2007 | Kubota | |
| 2018/0030216 A1 | 2/2018 | Emori et al. | |
| 2020/0010597 A1 | 1/2020 | Mosaki | |
| 2020/0199327 A1 | 6/2020 | Inoue | |
| 2020/0332080 A1 | 10/2020 | Otani | |
| 2021/0155729 A1 * | 5/2021 | Toge .................. | C08K 5/3492 |
| 2022/0306786 A1 * | 9/2022 | Toge .................. | C08K 5/31 |

FOREIGN PATENT DOCUMENTS

| | | | |
|---|---|---|---|
| JP | 06-145257 A | | 5/1994 |
| JP | 06-345931 A | | 12/1994 |
| JP | 08-301942 A | | 11/1996 |
| JP | 11-140264 A | | 5/1999 |
| JP | 2006-193559 A | | 7/2006 |
| JP | 2010-270173 A | | 12/2010 |
| JP | 2018016766 A | * | 2/2018 |
| JP | 2018-044114 A | | 3/2018 |
| WO | 2005/082960 A1 | | 9/2005 |
| WO | 2010/024434 A1 | | 3/2010 |
| WO | 2016/136697 A1 | | 9/2016 |
| WO | 2018/180207 A1 | | 10/2018 |
| WO | 2019/044592 A1 | | 3/2019 |
| WO | 2019/087788 A1 | | 5/2019 |

OTHER PUBLICATIONS https://www.adeka.co.jp/en/chemical/products/pvc/pro125c.html, 2024 (Year: 2024).*
JP 2018-016766A, machine translation, 2018 (Year: 2018).*
ISR issued in International Patent Application No. PCT/JP2020/048092, Mar. 16, 2021, translation.
IPRP issued in International Patent Application No. PCT/JP2020/048092, Aug. 4, 2022, translation.
Written Opinion issued in International Patent Application No. PCT/JP2020/048092, Mar. 16, 2021, translation.
DuPont: "Dupont™ VAMAC® Ethylene Acrylic Elastomer—Thrive in a Harsh World" 2018, pp. 1-4, XP 093118914.

* cited by examiner

*Primary Examiner* — Satya B Sastri
(74) *Attorney, Agent, or Firm* — GREENBLUM & BERNSTEIN, P.L.C.

(57) ABSTRACT

An acrylic rubber composition comprising 5 to 15 parts by weight of a plasticizer having a solubility parameter SP value (by Small's method) of 8.5 to 10.5 based on 100 parts by weight of super cold resistant grade acrylic rubber having a glass transition point Tg of −42° C. or less, wherein the acrylic rubber composition can give a vulcanizate with the TR10 value, which is an index of cold resistance, of −42° C. or less both initially and after oil dipping. In the acrylic rubber composition, first, the ratio of an acrylate monomer that constitutes acrylic rubber is adjusted, thereby the low temperature characteristics can be maintained even in an oil contact environment. This intentionally reduces the oil resistance of the vulcanized rubber molded product, thereby increasing the amount of oil swelling into the vulcanized rubber molded product and improving the flexibility in a low temperature environment.

7 Claims, No Drawings

ACRYLIC RUBBER COMPOSITION

TECHNICAL FIELD

The present invention relates to an acrylic rubber composition. More particularly, the present invention relates to an acrylic rubber composition that can give a vulcanized molded product having initial cold resistance and showing excellent low temperature characteristics even in the actual usage environment that comes into contact with a low viscosity oil.

BACKGROUND ART

In recent years, there has been a major trend to reduce the viscosity of oil used in engines and drive systems in order to improve fuel efficiency.

Acrylic rubber has a good balance between heat resistance, cold resistance, and oil resistance, and is widely used as a seal member for automobiles, including drive systems. However, when a low viscosity oil is applied to such a seal member for automobiles, rubber materials are hardened in the environment using low temperature, whereas the low viscosity oil maintains fluidity, which reduces sealing performance and may lead to oil leakage.

Even when using acrylic rubber polymer, which is commercially available as cold resistant grade in general, it is difficult to ensure sufficient sealing performance against low viscosity oil.

In addition, it is possible to improve sealing performance by devising design, such as changing the shape of the oil seal or increasing tightness; however, these methods tend to increase sliding torque, which is contrary to the purpose of low fuel consumption.

The addition of a plasticizer is a common method of improving low temperature characteristics; however, it is necessary for the plasticizer to have a good compatibility with rubber compounds. If the compatibility is insufficient, it can lead to defects in the machining process and bleed out of the vulcanized molded products. Even if a plasticizer is added for the purpose of improving low temperature characteristics, in the case of the contact with oil in the actual usage environment, the plasticizer may be extracted, and the expected low temperature characteristics may not be obtained.

PRIOR ART DOCUMENTS

Patent Documents

Patent Document 1: JP-A-6-145257

OUTLINE OF THE INVENTION

Problem to be Solved by the Invention

An object of the present invention is to provide an acrylic rubber composition that can give a vulcanized molded product having initial cold resistance and showing excellent low temperature characteristics even in the actual usage environment that comes into contact with a low viscosity oil.

Means for Solving the Problem

The above object of the present invention can be achieved by an acrylic rubber composition comprising 5 to 15 parts by weight of a plasticizer having a solubility parameter SP value (by Small's method) of 8.5 to 10.5 based on 100 parts by weight of super cold resistant grade acrylic rubber having a glass transition point Tg of −42° C. or less, wherein the acrylic rubber composition can give a vulcanizate with a TR10 value, which is an index of cold resistance, of −42° C. or less both initially and after oil dipping.

Effect of the Invention

In the acrylic rubber composition according to the present invention, first, the ratio of an acrylate monomer that constitutes acrylic rubber is adjusted, whereby the low temperature characteristics can be maintained even in an oil contact environment, specifically, in an oil contact environment with a viscosity of 2000 mPa·s or less at −40° C. This intentionally reduces the oil resistance of the vulcanized rubber molded product, thereby increasing the amount of oil swelling into the vulcanized rubber molded product and improving the flexibility in a low temperature environment.

Secondary, a plasticizer having a solubility parameter SP value of 8.5 to 10.5, which shows good compatibility with an acrylic rubber compound, is selected.

This provides an acrylic rubber composition that can give a vulcanized molded product having initial cold resistance and showing excellent low temperature characteristics even in the actual usage environment that comes into contact with a low viscosity oil.

That is, the addition of a plasticizer results in excellent initial cold resistance, and the excellent cold resistance can be maintained even after oil dipping by adjusting oil resistance (for example, using an oil with a viscosity of 2000 mPa·s or less at −40° C. for increasing the volume change rate, which in a dipping test at 150° C. for 70 hours is increased to 6% or more). Therefore, it is suitable as a material for an oil seal when using trendy low viscosity drive system oil, such as an oil seal for drive train.

EMBODIMENTS FOR CARRYING OUT THE INVENTION

The acrylic rubber composition of the present invention comprises super cold resistant grade acrylic rubber and a plasticizer having a specific SP value.

The super cold resistant grade acrylic rubber is acrylic rubber having a glass transition point Tg (according to JIS K6240) of −42° C. or less, obtained by adjusting the ratio of an acrylate comonomer, and selected, for example, from the chlorine group-containing acrylic rubber described in Patent Document 1.

Usable examples of alkyl acrylate in the chlorine group-containing acrylic rubber include methyl acrylate, ethyl acrylate, propyl acrylate, isopropyl acrylate, n-butyl acrylate, n-hexyl acrylate, 2-ethylhexyl acrylate, and n-octyl acrylate, as well as methacrylates corresponding to these acrylates. In general, alkyl groups with a longer chain length are advantageous in terms of cold resistance, but disadvantageous in terms of oil resistance. These characteristics tend to be reversed when the chain length becomes shorter. From the viewpoint of balance between oil resistance and cold resistance, ethyl acrylate and n-butyl acrylate are preferably used. In the present invention, n-butyl acrylate is particularly preferable, and the copolymerization ratio thereof is about 65 to 75.5 wt. % in the copolymer as the amount of charged monomers other than an active chlorine group-containing vinyl monomer.

Moreover, usable examples of alkoxyalkyl acrylate in the chlorine group-containing acrylic rubber include methoxymethyl acrylate, methoxyethyl acrylate, ethoxyethyl acrylate, n-butoxyethyl acrylate, ethoxypropyl acrylate, and the like; preferably 2-methoxyethyl acrylate and 2-ethoxyethyl acrylate. Although alkoxyalkyl acrylate and alkyl acrylate can also be used singly, it is preferable that the former is used at a ratio of 60 to 0 wt. %, while the latter is used at a ratio of 40 to 100 wt. %. When alkoxyalkyl acrylate is copolymerized, the balance between oil resistance and cold resistance becomes excellent. However, if alkoxyalkyl acrylate is copolymerized at a ratio larger than the above range, the normal state physical properties and heat resistance tend to decrease. In the present invention, 2-methoxyethyl acrylate is particularly preferable, and the copolymerization ratio thereof is about 35 to 20 wt. % in the copolymer as the amount of charged monomers other than an active chlorine group-containing vinyl monomer.

Patent Document 1 discloses acrylic rubber which is obtained by copolymerizing 60 to 99.8 wt. % of n-butyl acrylate and 2-methoxyethyl acrylate, 0.1 to 10 wt. %, preferably 1 to 5 wt. %, of an active chlorine group-containing vinyl monomer, and 30 wt. % or less of other vinyl monomers, in which as alkyl acrylate, n-butyl acrylate is copolymerized at a ratio of about 40 to 85 wt. % in the copolymer, and as alkoxyalkyl acrylate, 2-methoxyethyl acrylate is copolymerized at a ratio of about 25 to 55 wt. % in the copolymer. Thus, the oil resistance is controlled by adjusting the copolymerization ratio of alkoxyalkyl acrylate.

As the active chlorine group-containing vinyl monomer, for example, vinyl monochloroacetate, 2-chloroethyl vinyl ether, allyl chloroacetate, or an addition reaction product of a glycidyl compound with monochloroacetic acid, such as glycidyl acrylate, glycidyl methacrylate, or allyl glycidyl ether, is used.

Moreover, this patent document indicates that when a blended product of terpolymer acrylic rubber of n-butyl acrylate, 2-methoxyethyl acrylate and vinyl monochloroacetate, and tetrapolymer acrylic rubber obtained by further copolymerizing the terpolymer rubber with $CH_2=CHCOOC_2H_4(COC_5H_{10}O)_mCOCH_3$ (m: 2.11 on average) is vulcanized, the vulcanizate having a TR10 value of −44° C., i.e., excellent cold resistance, is provided, while the TR10 value of a vulcanizate of the terpolymer acrylic rubber alone is merely −40° C.

As the vulcanizing agent for the active chlorine group-containing acrylic rubber, a vulcanization system comprising a higher fatty acid metal salt (fatty acid metal soap) and sulfur (donor) is used at a ratio of each about 0.5 to 10 parts by weight preferably about 1.5 to 8 parts by weight, and about 0.2 to 5 parts by weight preferably about 0.4 to 3 parts by weight respectively, based on 100 parts by weight of the active chlorine group-containing acrylic rubber.

As the vulcanizing agent for the active chlorine group-containing acrylic rubber, a triazine compound is also used.

The acrylic rubber of the present invention is preferably a copolymer which is obtained by copolymerizing 1 to 3 wt. % of a vinyl monochloroacetate monomer as a crosslinkable comonomer in the copolymer, in which 65 to 75.5 wt. % of n-butyl acrylate and 35 to 20 wt. % of 2-methoxyethyl acrylate are charged in 100 wt. % of comonomers other than the crosslinkable comonomer and then copolymerized.

Further, if necessary, for the purpose of improving the kneading processability, extrusion processability, and the like, polyfunctional (meth)acrylates or oligomers having a glycol residue in side chains can be further copolymerized. Examples thereof include di(meth)acrylates of alkylene glycols, such as ethylene glycol, propylene glycol, 1,4-butanediol, 1,6-hexanediol, and 1,9-nonanediol; di(meth)acrylates, such as neopentyl glycol, tetraethylene glycol, tripropylene glycol, and polypropylene glycol; bisphenol A-ethylene oxide adduct diacrylate, dimethylol tricyclodecane diacrylate, glycerol methacrylate acrylate, 3-acryloyloxyglycerol monomethacrylate, and the like. Comonomers other than the crosslinkable comonomer can be made to 100% by copolymerizing them.

Moreover, as another super cold resistant grade crosslinkable group-containing acrylic rubber, the present applicant has previously proposed a super cold resistant grade acrylic rubber, which is a copolymer obtained by copolymerizing 1 to 3 wt. %, preferably 1 to 2.5 wt. %, of a fumaric acid monoalkyl ester monomer as a crosslinkable comonomer in the copolymer, in which 45 to 65 wt. %, preferably 56 to 62 wt. % of n-butyl acrylate, 12 to 32 wt. %, preferably 12 to 23 wt. % of 2-methoxyethyl acrylate, and 11 to 30 wt. %, preferably 19 to 26 wt. %, of ethoxy ethoxy ethyl acrylate are copolymerized in 100 wt. % of comonomers other than the crosslinkable comonomer (Japanese Patent Application No. 2019-110275).

In addition to the vulcanizing agent described in Patent Document 1, the obtained crosslinkable group-containing acrylic rubber is compounded with an aromatic diamine compound vulcanizing agent and preferably further a guanidine compound vulcanization aid, and then vulcanized and molded.

Examples of usable aromatic diamine compound include 4,4'-methylenedianiline, m-phenylenediamine, 4,4'-diaminodiphenyl ether, p-phenylenediamine, p,p'-ethylenedianiline, 4,4'-(p-phenylenediisopropylidene)dianiline, 4,4'-(m-phenylenediisopropylidene)dianiline, 3,4'-diaminodiphenyl ether, 4,4'-diaminodiphenyl sulfone, 2,2-bis[4-(4-aminophenoxy)phenyl]propane, bis[4-(4-aminophenoxy)phenyl]sulfone, bis[4-(3-aminophenoxy)phenyl]sulfone, 4,4'-bis(4-aminophenoxy)biphenol, bis[4-(4-aminophenoxy)phenyl]ether, 2,2-bis[4-(4-aminophenoxy)phenyl]hexafluoropropane, 1,4-bis(4-aminophenoxy)benzene, 1,3-bis(4-aminophenoxy)benzene, and the like; preferably p-diamino substituted products are used. Such the aromatic diamine compounds are used at a ratio of about 0.1 to 5 parts by weight, preferably about 0.2 to 4 parts by weight, more preferably about 0.5 to 3 parts by weight, based on 100 parts by weight of the crosslinkable group-containing acrylic copolymer. If the compounding ratio is less than this range, vulcanizing is insufficient, and sufficient compression set resistance characteristics cannot be obtained. In contrast, if the aromatic diamine compound is used at a ratio larger than this range, scorch occurs, and vulcanizing does not occur. In contrast, if an aliphatic diamine compound or an alicyclic diamine compound is used, scorch is very highly likely to occur, and it is difficult to secure processing stability.

Further, examples of the usable guanidine compound include, in addition to guanidine, diphenylguanidine, tetramethylguanidine, tetraethylguanidine, di-o-tolylguanidine, 1-o-tolylbiguanide, di-o-tolylguanidine salts of dicatechol borate, and the like. Especially, diphenylguanidine and di-o-tolylguanidine are preferably used. Such guanidine compounds are used at a ratio of about 0.1 to 10 parts by weight, preferably about 0.3 to 6 parts by weight, more preferably about 0.5 to 4 parts by weight, based on 100 parts by weight of the crosslinkable group-containing acrylic copolymer. If the compounding ratio is less than this range, the vulcanizing rate decreases, and secondary vulcanizing takes a long time, which is not practical. In contrast, if the guanidine compound is used at a ratio larger than this range, vulcanizing is inhibited, and sufficient compression set resistance characteristics cannot be obtained. When a vulcanization accelerator other than the guanidine compound is used, sufficient compression set resistance characteristics cannot be obtained.

A plasticizer having an SP value (solubility parameter; by Small's method) of 8.5 to 10.5 is used to the super cold resistance grade acrylic rubber at a ratio of 5 to 15 parts by weight based on 100 parts by weight of it.

Examples of the usable plasticizers having such an SP value include ADK Cizer RS700 (polyethyleneglycol (Mw: 300) di(2-ethylhexanoate), number of ethylene oxide groups: 6 on average, SP value: 8.9) produced by Adeka Corporation, ADK Cizer RS107 (adipic acid diester, SP value: 9.2) produced by Adeka Corporation, ADK Cizer RS1000 (polyether ester, SP value: 9.7) produced by Adeka Corporation, and the like.

If a plasticizer having an SP value that is larger or less than the above range is used, processability and the like are deteriorated. Further, if the use ratio of the plasticizer is larger than the above range, kneading processability and oil swelling resistance are deteriorated. In contrast, if the use ratio of the plasticizer is less than the above range, initial cold resistance is deteriorated.

After a reinforcing agent, a filler, a stabilizer, a processing aid, and the like are added to the acrylic copolymer and the plasticizer having a specific SP value by using a closed kneader, a vulcanizing agent and a vulcanization accelerator are added by using an open roll to form a crosslinkable composition, followed by press vulcanization at about 150 to 200° C. for about 1 to 30 minutes and then, if necessary, oven vulcanization (secondary vulcanization) at about 150 to 180° C. for about 1 to 16 hours.

EXAMPLES

The following describes the present invention with reference to Examples.

Example 1

(1) In a separable flask equipped with a thermometer, a stirrer, a nitrogen gas inlet tube, and a Dimroth condenser, a monomer mixture comprising:

| | |
|---|---|
| n-butyl acrylate | 70 parts by weight |
| 2-methoxyethyl acrylate | 28 parts by weight |
| vinyl monochloroacetate | 2 parts by weight, |

187 parts by weight of water, 1.6 parts by weight of each of surfactants (sodium lauryl sulfate and polyoxyethylene lauryl ether), and 0.0035 parts by weight of a chain transfer agent (n-dodecyl mercaptan) were charged. After nitrogen gas replacement was performed to sufficiently remove oxygen in the system, a redox-based initiator comprising 0.011 parts by weight of sodium formaldehyde sulfoxylate and 0.0063 parts by weight of tert-butyl hydroperoxide was added. The copolymerization reaction was started under room temperature conditions, and the reaction was continued until the polymerization conversion rate reached 90% or more.

The formed aqueous latex was coagulated with a 10 wt. % aqueous sodium sulfate solution, washed with water, and dried, thereby obtaining a crosslinkable group-containing acrylic polymer A (glass transition point Tg measured according to JIS K6240: −47° C.).

| | |
|---|---|
| (2) Crosslinkable group-containing acrylic polymer A | 100 parts by weight |
| FEF carbon black | 50 parts by weight |
| Silica | 40 parts by weight |
| Vulcanizing agent (sulfur) | 0.3 parts by weight |
| Vulcanization accelerator (sodium stearate) | 3 parts by weight |
| Vulcanization accelerator (potassium stearate) | 0.25 parts by weight |
| Plasticizer (ADK Cizer RS700, SP value: 8.9) | 8.5 parts by weight |

Each of the above components and various compounding agents required in terms of vulcanization, physical characteristics, and compound were kneaded using a closed kneader and an open roll. The kneaded product was subjected to press vulcanization at 180° C. for 6 minutes and oven vulcanization (secondary vulcanization) at 170° C. for 6 hours, thereby obtaining a vulcanized rubber sheet with a thickness of 2 mm.

The obtained kneaded product and vulcanized rubber sheet were measured and evaluated for each of the following items.

Processability:

Kneading processability: Good was evaluated as ○, bad was evaluated as x

Bleeding properties: Less was evaluated as ○, and more was evaluated as x

Oil swelling resistance: according to JIS K6258 corresponding to ISO 1817:1999 150° C., 70 hours The volume change rate during dipping in a low viscosity oil at 1100 mPa·s or 1700 mPa·s (40° C.) was measured 6% or more was evaluated as ○, and less than 6% was evaluated as x Cold resistance: The TR10 value was measured according to JIS K6261 corresponding ISO 2921:1997

At the initial state, or dipped in a low viscosity oil of 1100 mPa·s or 1700 mPa·s (40° C.) at 150° C. for 70 hours −42° C. or less was evaluated as ○, and higher than −42° C. was evaluated as x

Example 2

In Example 1, the amount of the plasticizer (ADK Cizer RS700) used in 1 (2) was changed to 6.0 parts by weight.

Example 3

In Example 1, the following monomer mixture was used in 1 (1), and a crosslinkable group-containing acrylic polymer B (glass transition point Tg: −48° C.) was obtained.

| | |
|---|---|
| n-butyl acrylate | 74 parts by weight |
| 2-methoxyethyl acrylate | 24 parts by weight |
| vinyl monochloroacetate | 2 parts by weight |

Example 4

In Example 1, the following monomer mixture was used in 1 (1), and a crosslinkable group-containing acrylic polymer C (glass transition point Tg: −46° C.) was obtained.

| n-butyl acrylate | 66 parts by weight |
|---|---|
| 2-methoxyethyl acrylate | 32 parts by weight |
| vinyl monochloroacetate | 2 parts by weight |

Example 5

In Example 1, the amount of the plasticizer (ADK Cizer RS700) used in 1 (2) was changed to 14 parts by weight.

Example 6

In Example 1, the same amount (8.5 parts by weight) of ADK Cizer RS107 (SP value: 9.2) was used as the plasticizer in 1 (2).

Comparative Example 1

In Example 1, the amount of the plasticizer (ADK Cizer) used in 1 (2) was changed to 4 parts by weight.

Comparative Example 2

In Example 1, the amount of the plasticizer (ADK Cizer) used in 1 (2) was changed to 16 parts by weight.

Comparative Example 3

(1) In Example 1, the following monomer mixture was used in 1 (1), and a crosslinkable group-containing acrylic polymer D (glass transition point Tg: −43° C.) was obtained.

| n-butyl acrylate | 56 parts by weight |
|---|---|
| 2-methoxyethyl acrylate | 42 parts by weight |
| vinyl monochloroacetate | 2 parts by weight |

(2) In Example 1, the plasticizer was not used in 1 (2).

Comparative Example 4

(1) In Example 1, the same amount the crosslinkable group-containing acrylic polymer D was used in place of the crosslinkable group-containing acrylic polymer A in 1 (1).

(2) In Example 1, the same amount (8.5 parts by weight) of plasticizer (ADK Cizer RS700) was used in 1 (2).

Comparative Example 5

In Comparative Example 4, the amount of the plasticizer (ADK Cizer RS700) was changed to 10.0 parts by weight.

Comparative Example 6

In Example 1, the same amount (8.5 parts by weight) of Diana Process Oil (SP value: 6.6) produced by Idemitsu Kosan Co., Ltd. was used as the plasticizer in 1 (2). Regarding processability, any of the item was ×, and oil swelling resistance and oil resistance were not measured.

Following Table shows the results obtained respectively in the above Examples and Comparative Examples.

TABLE

| Measurement · Evaluation Items | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Processability | | | | | | | | | | | |
| Kneading processability | ○ | ○ | ○ | ○ | ○ | ○ | ○ | X | ○ | ○ | ○ |
| Bleeding properties | ○ | ○ | ○ | ○ | ○ | ○ | ○ | ○ | ○ | ○ | ○ |
| Oil swelling resistance (volume change rate; %) | | | | | | | | | | | |
| 1100 mPa · s oil dipping | +9 | +9 | +11 | +6 | +6 | +8 | +10 | +5 | +7 | +5 | +4 |
| Evaluation of the above | ○ | ○ | ○ | ○ | ○ | ○ | ○ | X | ○ | X | X |
| 1700 mPa · s oil dipping | +13 | +14 | +16 | +10 | +10 | +13 | +15 | +9 | +10 | +8 | +5 |
| Evaluation of the above | ○ | ○ | ○ | ○ | ○ | ○ | ○ | ○ | ○ | ○ | ○ |
| Cold resistance (TR10 value; ° C.) | | | | | | | | | | | |
| Initial | −43 | −42 | −43 | −43 | −46 | −45 | −41 | −46 | −37 | −41 | −42 |
| 1100 mPa · s oil dipping | −43 | −42 | −43 | −42 | −42 | −42 | −43 | −42 | −40 | −39 | −39 |
| 1700 mPa · s oil dipping | −43 | −42 | −43 | −42 | −42 | −42 | −43 | −42 | −40 | −40 | −40 |
| Evaluation of the above | ○ | ○ | ○ | ○ | ○ | ○ | X | ○ | X | X | X |

The above results demonstrate the following.

(1) Those of the Examples show excellent processability, oil swelling resistance, and initial cold resistance as well as cold resistance after oil dipping. In the actual usage environment, it is not always the same as the oil-dipped state of the present invention and the amount of oil that comes into contact with the rubber decreases, for example, immediately after starting the engine. In addition, the cold resistance in the dipped state may differ depending on the type of oil; thus, the initial TR10 value is important as the cold resistance of the rubber composition itself.

(2) When a less amount of the specified plasticizer is used, initial cold resistance is deteriorated (Comparative Example 1). When a larger amount of the specified plasticizer is used, kneading processability and oil swelling resistance are deteriorated (Comparative Example 2).

(3) When the specified plasticizer is not used, cold resistance is deteriorated (Comparative Example 3).

(4) When an acrylic polymer in which the ratio of an acrylate monomer is out of the specified range is used, oil swelling resistance and (initial) cold resistance are deteriorated (Comparative Examples 4 and 5).

(5) When a plasticizer that does not have the specified SP value is used, processability is deteriorated (Comparative Example 6). That is, the amount of bleeding from the unvulcanized compound or the acrylic rubber composition is large, and processability is impaired.

The invention claimed is:

1. An acrylic rubber composition comprising 5 to 15 parts by weight of a plasticizer having a solubility parameter SP value (by Small's method) of 8.5 to 10.5 based on 100 parts by weight of super cold resistant grade acrylic rubber having a glass transition point Tg of −42° C. or less, wherein the acrylic rubber composition provides a vulcanizate with a TR10 value, which is an index of cold resistance, of −42° C. or less both initially and after oil dipping;

wherein the vulcanizate exhibits a volume change rate of +6% or more in a dipping test at 150° C. for 70 hours according to JIS K6258 corresponding to ISO 1817: 1999, and wherein the super cold resistant grade acrylic rubber is a copolymer obtained by copolymerizing 1 to 3 wt. % of a vinyl monochloroacetate monomer as a crosslinkable comonomer in the copolymer, in which 67.35 to 75.51 wt. % of n-butyl acrylate and 32.65 to 24.49 wt. % of 2-methoxyethyl acrylate are charged in 100 wt. % of comonomers other than the crosslinkable comonomer and then copolymerized, and the copolymer consisting of n-butyl acrylate, 2 methoxyethyl acrylate and the crosslinkable comonomer.

2. A vulcanized molded product of the acrylic rubber composition according to claim 1.

3. The vulcanized molded product according to claim 2, which is used in an oil contact environment, oil having a viscosity of 2000 mPa·s or less at −40° C.

4. The vulcanized molded product according to claim 3, which is used in an oil of a viscosity of 2000 mPa·s or less at −40° C. and has a volume change rate of +6% or more in a dipping test at 150° C. for 70 hours.

5. The vulcanized molded product according to claim 2, which is an oil seal.

6. The vulcanized molded product according to claim 5, which is an oil seal for drive train.

7. A vulcanized molded product of the acrylic rubber composition according to claim 1.

* * * * *